US011553218B2

(12) United States Patent
Ganti et al.

(10) Patent No.: US 11,553,218 B2
(45) Date of Patent: Jan. 10, 2023

(54) JUST AFTER BROADCAST MEDIA CONTENT

(71) Applicant: Amazon Technologies, Inc., Seattle, WA (US)

(72) Inventors: Ravindra Ganti, Sammamish, WA (US); Parminder Singh, Seattle, WA (US); John F. X. Gaquin, Lynnwood, WA (US); Michael James Montgomery, Seattle, WA (US); Charles M. Cordova, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 671 days.

(21) Appl. No.: 16/259,468

(22) Filed: Jan. 28, 2019

(65) Prior Publication Data
US 2020/0186848 A1    Jun. 11, 2020

Related U.S. Application Data

(60) Provisional application No. 62/776,999, filed on Dec. 7, 2018.

(51) Int. Cl.
*H04N 21/472* (2011.01)
*H04N 21/433* (2011.01)
(Continued)

(52) U.S. Cl.
CPC ... *H04N 21/23106* (2013.01); *H04N 21/2187* (2013.01); *H04N 21/2335* (2013.01); *H04N 21/2387* (2013.01); *H04N 21/4331* (2013.01)

(58) Field of Classification Search
None
See application file for complete search history.

(56) References Cited

U.S. PATENT DOCUMENTS 9,742,749 B1\* 8/2017 Richter ............. H04N 21/6125
2010/0325657 A1\* 12/2010 Sellers ............. H04N 21/2387
725/32

(Continued)

FOREIGN PATENT DOCUMENTS

AU    2015202846    7/2016

OTHER PUBLICATIONS

PCT International Search Report and Written Opinion dated Mar. 6, 2020, issued in Application No. PCT/US2019/060109.
(Continued)

*Primary Examiner* — Nicholas R Taylor
*Assistant Examiner* — Ho T Shiu
(74) *Attorney, Agent, or Firm* — Weaver Austin Villeneuve & Sampson LLP

(57) ABSTRACT

Methods and apparatus are described for making broadcast content available as an on-demand asset soon after all of the video fragments of the broadcast content have been made available. As the video fragments of the broadcast content are made available, they are requested and archived. When all of the fragments for the duration of the broadcast content are available (e.g., a live event ends), a VOD-style manifest is generated and the archived fragments are made available for downloading or streaming using the VOD-style manifest.

18 Claims, 3 Drawing Sheets

(51) Int. Cl.
    *H04N 21/231*    (2011.01)
    *H04N 21/2187*   (2011.01)
    *H04N 21/2387*   (2011.01)
    *H04N 21/233*    (2011.01)

(56) References Cited

U.S. PATENT DOCUMENTS

| | | | |
|---|---|---|---|
| 2012/0131146 A1* | 5/2012 | Choi | H04L 67/1029 |
| | | | 709/219 |
| 2014/0165116 A1* | 6/2014 | Major | H04N 21/234363 |
| | | | 725/89 |
| 2014/0229976 A1 | 8/2014 | Ma et al. | |
| 2015/0296274 A1* | 10/2015 | Good | H04N 21/26258 |
| | | | 725/93 |
| 2016/0080470 A1 | 3/2016 | Shanson | |
| 2018/0310032 A1 | 10/2018 | Reitmeyer et al. | |
| 2019/0306581 A1* | 10/2019 | Her | H04N 21/26258 |

OTHER PUBLICATIONS

EP Communication under Rules 161(1) and 162 EPC dated Jul. 15, 2021, in Application No. EP19835988.7.
EP Office Action dated May 9, 2022, in Application No. EP19835988.7.
International Preliminary Report on Patentability and the Written Opinion of the International Searching Authority, dated Jun. 8, 2021, for International Patent Application No. PCT/US2019/060109.

* cited by examiner

JUST AFTER BROADCAST MEDIA CONTENT

RELATED APPLICATION DATA

The present application is a non-provisional application that claims priority under 35 U.S.C. 119(e) to U.S. Provisional Application No. 62/776,999 entitled JAB Technical Architecture for Live Playback filed on Dec. 7, 2018, the entire disclosure of which is incorporated herein by reference for all purposes.

BACKGROUND

Generally speaking, video content services provide two broad classes of video content; broadcast content and video-on-demand (VOD) content. VOD content refers to preexisting video content (e.g., movies and TV series) that may be downloaded or streamed to client devices at any time. Broadcast content refers to content that is made available for streaming in real time, and may include presentations of live events (e.g., sporting events or concerts), or be made available according to a schedule dictated by the content or service provider (e.g., TV network channels, premium movie channels, etc.).

After a presentation of a live event has been delivered as broadcast content, a video content service may want to make the video of the live event available as a VOD asset. Conventionally, this has involved recording the streams of the video of the live event as static video files, and then re-encoding the videos file as VOD assets. The time required to do this is codec dependent, but typically requires about 10 times the duration of the original video file. For the typical football game, this means that the video of the game won't be available as a VOD asset for 30 to 40 hours after the game is finished.

DETAILED DESCRIPTION

This disclosure describes techniques for making broadcast content available as an on-demand asset (also referred to herein as a Just After Broadcast or JAB asset) soon after all of the fragments of the broadcast content have been made available. In the case of broadcast content depicting a live event, this might be within minutes or even seconds of completion of the live event. As the fragments of the content are made available as broadcast content, they are requested and archived. When all of the fragments for the duration of the broadcast content are available (e.g., a live event ends), an on-demand-style manifest is generated and the archived fragments are made available for downloading or streaming as an on-demand asset. An example may be instructive.

Figure 1:
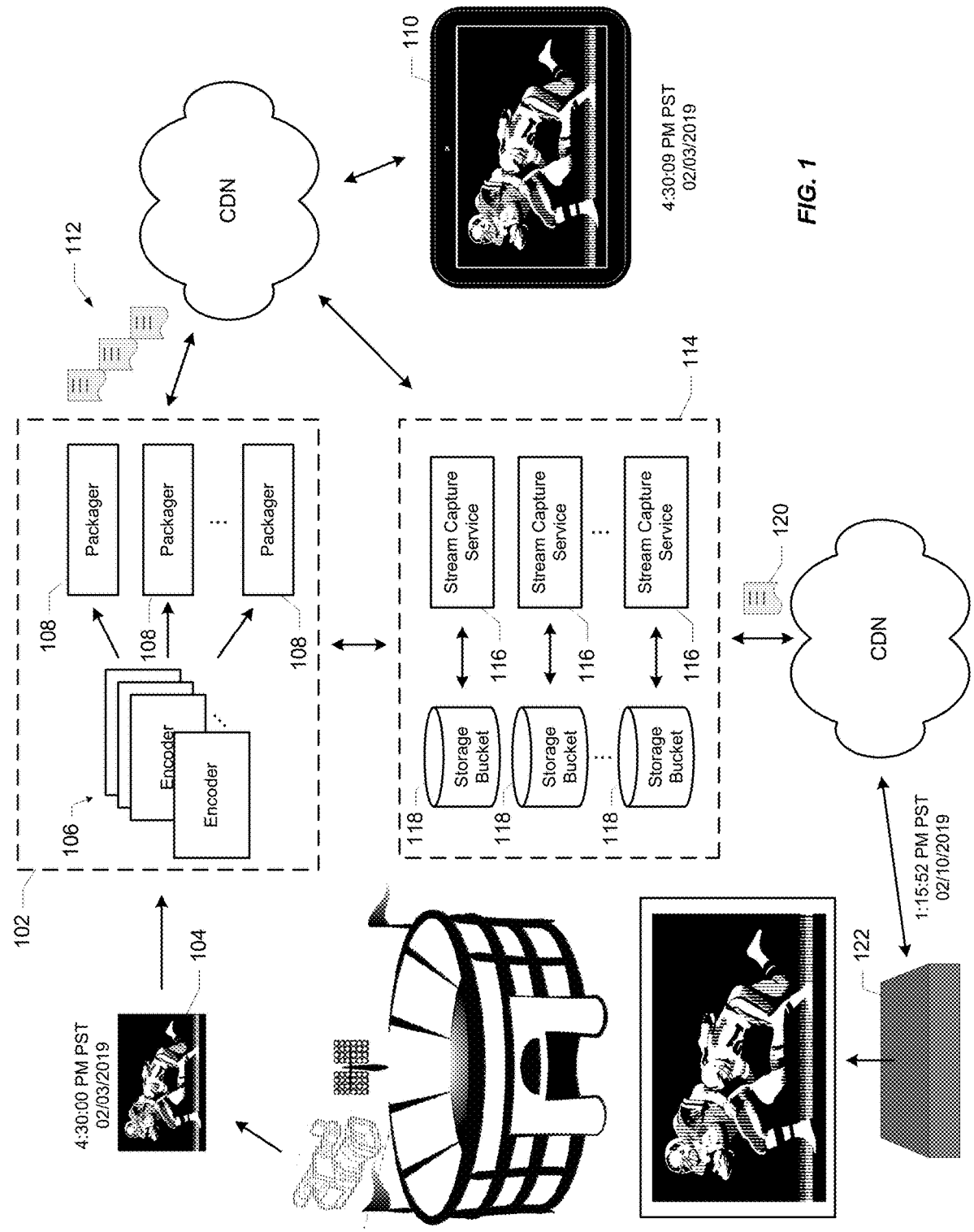
FIG. 1 illustrates an example of a particular class of implementations for converting broadcast content to on-demand assets as enabled by the present disclosure.

FIG. 1 shows a live content service 102 that captures video 104 of a live event (in this example a football game) using one or more video cameras. Service 102 encodes (using encoders 106) and packages (using packagers 108) the captured video for delivery as a plurality of live streams that include different quality-level and bitrate versions of the content delivered according to a number of streaming protocols including, for example, HTTP Live Streaming (HLS), Dynamic Adaptive Streaming over HTTP (DASH), and Smooth Streaming. Live streaming clients (e.g., tablet 110) consume the live content (delayed only a few seconds from the live action) using live manifests 112 that are periodically made available by service 102 (e.g., generated by packagers 108) as additional content is encoded and packaged.

While the live event is ongoing, a broadcast content conversion service 114 captures the broadcast content for each supported streaming protocol using a pool of stream capture services 116. Using the live manifests published by the packagers (possibly requesting the live manifests directly from the packagers), the stream capture services 116 request all available fragments of the broadcast content. The requested fragments are then archived in a corresponding storage bucket 118.

When all of the fragments of the broadcast content have been made available (e.g., upon completion of the live event), service 114 generates a VOD-style manifest 120 for each streaming protocol that includes fragment references (e.g., relative URLs) for each of the fragments of the corresponding quality-level and bitrate variants. Each VOD-style manifest also includes a beginning and an end time that cover the duration of the broadcast content. The fragment references in the VOD-style manifests are the same as or similar to the fragment references in the live manifests generated by packagers 108 but have different root paths, referencing storage locations of the fragments captured by service 114. The VOD-style manifests are then published and used by clients (e.g., set top box 122) to request the archived fragments of the broadcast content as on-demand or JAB assets; even long after the live event ends. In the example depicted in FIG. 1, set top box 122 is shown as displaying the same point in the game as tablet 110 a week after the game. However, it is important to note that, because the depicted approach does not require re-encoding of the broadcast content, video of the game can be delivered as an on-demand asset within minutes or even seconds of its completion.

Figure 2:
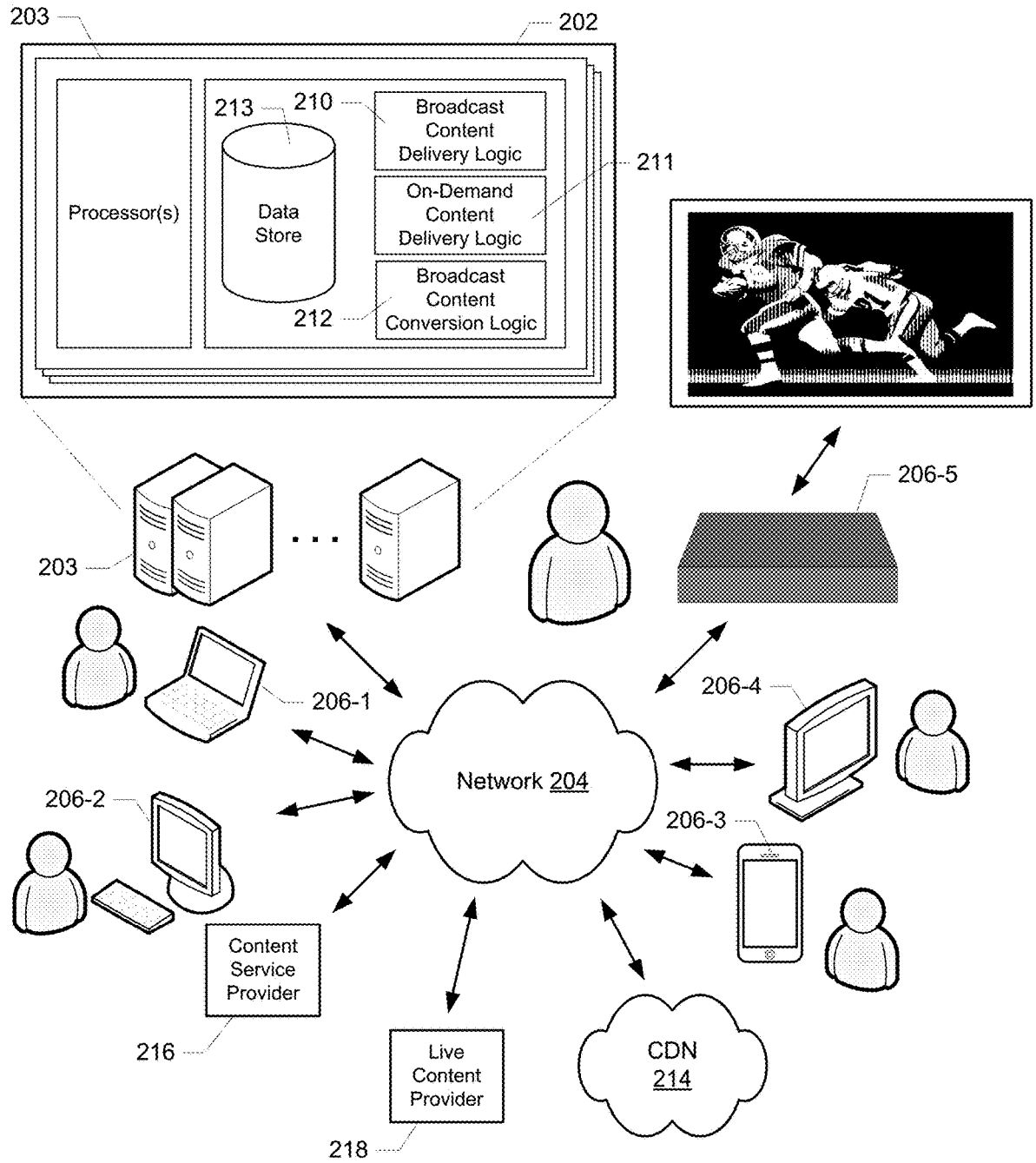
FIG. 2 illustrates an example of a computing environment in which implementations enabled by the present disclosure may be practiced.

FIG. 2 illustrates an example of a computing environment in which a video content service 202 provides video content via network 204 to a variety of client devices (206-1 through 206-5) in accordance with the techniques described herein. The video content may include live or broadcast content, conventional VOD content, and/or on-demand content as described herein, e.g., JAB content. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both broadcast content and JAB content to client devices. However, it will be understood that content service 202 may provide access to content in conjunction with one or more content delivery networks (e.g., CDN 214) that may or may not be independent of content service 202. In addition, the source(s) of one or both of the broadcast and JAB content may be independent of or integrated to various degrees with content service 202 (e.g., as represented by content provider server 216 and live content provider 218). The range of variations known to those of skill in the art are contemplated to be within the scope of this disclosure.

In addition to broadcast content delivery logic 210 and on-demand content deliver logic 211 (each of which facilitates various aspects of content delivery to client devices 206), content service 202 may include broadcast content conversion logic 212 that facilitates the conversion of broadcast content to on-demand or JAB content as enabled by the present disclosure.

In addition to providing access to video content, content service 202 may also include a variety of information related to the video content (e.g., broadcast and on-demand content and associated metadata and manifests in data store 213 to which service 202 provides access). Alternatively, such information associated with and/or about the content, as well as the content itself may be provided and/or hosted by one or more separate platforms, e.g., CDN 214 or remote cloud storage. It should be noted that, while logic 210, 211, and 212, and data store 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
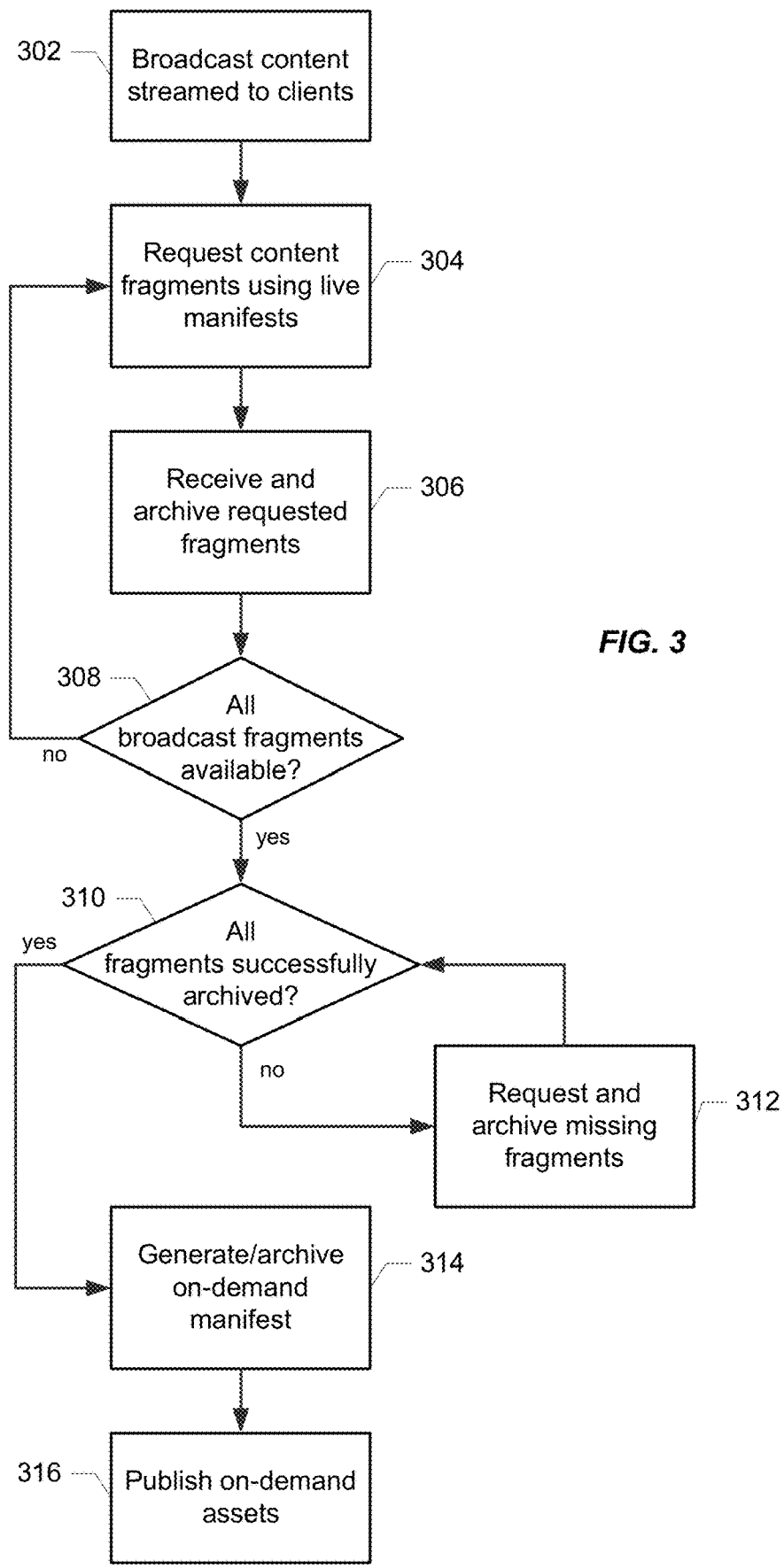
FIG. 3 is a flowchart illustrating operation of a particular class of implementations enabled by the present disclosure.

The conversion of broadcast content to on-demand or JAB content according to a particular implementation is illustrated in the flow chart of FIG. 3. It should be noted that this and other examples described herein may be employed with any of a variety of video codecs including, for example, MPEG-1, MPEG-2, MPEG-4 Part 2, VC-1, H.263, VP8, VP9, Daala, H.264 (AVC), and H.265 (HEVC). Moreover, the basic principles described herein may be employed with any of a variety of streaming protocols by which client devices consume content including, for example, Apple's HTTP Live Streaming (HLS), Microsoft's Smooth Streaming, Adobe's HTTP Dynamic Streaming, Dynamic Adaptive Streaming over HTTP (DASH), etc.

Referring to FIG. 3, broadcast video content is generated and streamed to a population of client devices (302). As discussed above, the broadcast video content may depict a live event such as, for example, a professional sporting event or a concert. The video and audio components of such content may be captured using cameras and microphones and a variety of other technologies to generate various auditory and/or visual elements of the content, which is then encoded and packaged for delivery to client devices. Alternatively, the broadcast content might not relate to a live event, but instead might include previously generated video content that is presented according to a schedule such as, for example, a TV network channel or a premium movie channel. More generally, broadcast content may be thought of as a specified time window of content on a specific content stream. Regardless of the nature of the broadcast content, consumption of the streams of broadcast content by the population of client devices is enabled by live manifests provided to the client devices that are periodically generated and/or updated by the content service providing the broadcast content. These live manifests may be generated by or derived from information provided by the packagers of the content streams.

Video fragments of the broadcast content are requested by components of a broadcast content conversion system using the live manifests (304). According to a particular class of implementations, this is accomplished using a plurality of stream capture processes or clients, e.g., one instance for each streaming protocol supported. Stream capture may be done for each combination of streaming protocol and origin if there are multiple origins (e.g., for redundancy). The stream capture processes may behave in some ways similarly to client device media players in the way in which they acquire the live manifests and use the live manifests to request video fragments. According to a particular implementation, the live manifests are obtained by periodically querying the packager instances for the latest manifest information (e.g., every two minutes). Each of these queries may specify a time-bounded window, the range and duration of which may be configurable. Unlike a client media player that typically only requests one variant of each fragment of the content, the stream capture processes request and archive all of the different variant fragments identified in the live manifests.

The requested video fragments are received and archived (306). According to a particular class of implementations, the video fragments are archived without alteration of the fragments, i.e., the fragments are not re-encoded or reformatted. The capture and archiving of the fragments without alteration allows for the rapid deployment of the content as a JAB asset. It may also allow the digital rights management (DRM) configuration of the broadcast content to be reused to support consumption of the JAB content.

The content fragments for each stream capture process/client may be archived in a designated cloud storage location (e.g., an S3 bucket on an Amazon Web Services platform).

And while the fragments themselves may be archived without alteration, implementations are contemplated in which the fragments may be renamed to optimize storage of the fragments in their cloud storage location. For example, an element of randomness can be introduced into each fragment file name using, for example, a hash of the file name (e.g., an MD-5 hash) as part of the new file name, thereby allowing the fragments to be sharded across partitions within the memory designated for that stream capture process. This allows for the ability to organize recordings in a hierarchical fashion by both recording identifier and stream type, while still providing randomness on the filenames.

Once all of the fragments of the broadcast content have become available (308), a check is performed to determine whether all of the fragments of the broadcast content for each streaming protocol have been successfully archived (310). If not, any missing fragments are requested and archived (312).

The determination that all of the fragments of the broadcast content are available may represent or be based on various conditions, events, or criteria depending on the implementation. For example, availability of all of the fragments may represent completion of a live event depicted by the broadcast content. Completion of the event might be indicated by a notification from the content provider, e.g., generated automatically or by a human operator. In another example, availability of all of the fragments might represent completion of a scheduled broadcast window as indicated by a notification from the content provider or a clock reference.

The availability of all fragments may also be determined based on the current live manifest information. For example, a request for the most recent live manifest information may specify a bounded window of time, the end of which is in the future. In such a case, the returned manifest information would be a live manifest that references as much content as currently available. On the other hand, if the end of the bounded window of time is in the past, the returned manifest information would be static, e.g., having a fixed length as opposed to increasing in length over time. This behavior may be used to determine that the broadcast period has completed and that, therefore, all of the fragments of the broadcast content should now be available.

According to some implementations, the bounded window of time for which manifest information is requested includes the start time of the broadcast content and so increases in duration over time. To the extent that the returned manifest information includes references to previously archived content, the fragments that have been requested and archived can be tracked to avoid duplicate downloads, i.e., new content requests might only be generated for previously unrequested fragments. However, the increasing length of the query window may be problematic for broadcast content having durations of several hours in that, as the broadcast period goes on, requests to the packager may time out before packager is able to respond with the manifest information for the entire requested window.

Therefore, according to some implementations, shorter, rolling query windows are used, the start time of which moves forward once the current query window fills up, e.g., once the packager returns a fixed-length manifest as discussed above. The specified duration of the rolling window may vary depending, for example, on the nature of the communication channel between the system and the packager, the responsiveness of the packager, the nature of the coupling or integration between the system and the packager, etc. According to a particular implementation, this approach also allows for repeated requests for any fragments that failed to archive properly in that the process loops over the same query window multiple times, and failed requests can therefore be repeated.

Once all of the fragments of the broadcast content have been successfully archived (e.g., 308-312), VOD-style or JAB manifest information is generated and/or archived (314). This manifest information may be archived for each stream capture process in the same memory area as the corresponding set of fragments. Unlike live manifests that may not specify an end time and typically increase in size over time as content fragments become available, VOD-style or JAB manifests, i.e., manifest information configured to provide on-demand access to content, are static in the sense that they specify an end time for the corresponding content.

For broadcast content depicting live events, the start and end times associated with the content may only be estimates in that the actual event may have a delayed start or the event may run long (e.g., a sporting event going into overtime). In such cases, it may be desirable to adjust the start and/or end times of a JAB asset to reflect the actual event content regardless of when the broadcast content actually starts and stops. According to a particular implementation, a broadcast content state service publishes events whenever a live feed starts or stops broadcasting. Using these events, the start and end times of a JAB asset can be adjusted in real-time, thereby ensuring that all or only the event content is recorded.

According to some implementations, the references (e.g., URLs) in both the live and JAB manifests are relative so the references in the live manifests don't need to be modified to generate the JAB manifests. Instead, the root template manifest that gets sent to a requesting client for JAB playback designates a different path on an origin than the live manifests. Therefore, the references of the JAB manifests end up being identical or substantially the same as the live manifests. However, because there is different relative pathing, they point to different fragment locations. Notwithstanding the foregoing, implementations are contemplated in which the JAB manifests refer to the storage locations of the fragments of the broadcast content such as those, for example, stored in the caches of CDN edge servers in conjunction with live streaming of the broadcast content.

According to some implementations, the JAB manifests are generated by sending a request to each packager for manifest information encompassing the entire presentation, and then archiving that manifest information (e.g., with a new root path). This might involve determining the query window based on a start time of the broadcast content and a final time stamp corresponding to the end of the broadcast. Alternatively, previously received live manifests may be processed and aggregated to generate the JAB manifests with specified end times. Regardless of how the JAB manifests are generated, this information may be used to determine whether all of the content fragments have been archived successfully and, if not, any missing fragments requested and archived (e.g., 310 and 312).

Once the JAB manifest information has been archived with the respective JAB assets, the JAB assets are published for consumption as on-demand versions of the broadcast content (316). This may involve publication of one or more events including, for example, publication of references (e.g., URLs) to the JAB manifest for each JAB asset. This may also involve establishing a parent/child relationship for each JAB asset with the broadcast content. Such a relationship might be useful, for example, in supporting use of an existing DRM configuration for the broadcast content to support distribution of the JAB assets. It might also be useful in integrating the JAB asset with the infrastructure by which client devices accessed the broadcast content. For example, the broadcast content may have been accessed via a video service asset details interface. Once the JAB assets are available, the same interface can be reconfigured to provide access to the JAB assets rather than the broadcast content.

A common use case of implementations enabled by the present disclosure is to capture a presentation of broadcast content in its entirety. However, implementations are contemplated in which presentations of shorter duration are supported. For example, separate JAB assets might be made for different parts of a live event, e.g., for each half, quarter, halftime show, etc., of a football or basketball game. Each JAB asset that is part of particular broadcast content has its own start and end times that are bounded by the start and end times of the broadcast content. As there are multiple JAB assets for the broadcast content, the relationship may be modeled as a single-parent/multiple-child relationship.

In some cases, the streams for a single presentation of broadcast content (e.g., depicting a live event) may simultaneously originate from multiple geographical locations in order to provide redundancy. These redundant streams typically have small differences in timing between them and so are not bit-for-bit identical even though they are produced from the same raw input source. In the event that one of these streams fails, the system will fail over to an equivalent stream at another location. The failed stream may exhibit artifacts or lack content entirely after the point of failure, making it unsuitable for conversion to a JAB asset as described herein. However, because the redundant streams are not identical the system may not readily start capturing fragments from a different stream without introducing noticeable artifacts in the resulting JAB asset. Therefore, according to some implementations, the system begins capturing all redundant streams and then stops capture of individual streams as they fail.

Because multiple redundant streams are captured, one of the resulting assets is chosen as the master JAB asset for subsequent on-demand distribution. This may be done, for example, by filtering out any failed captures and selecting from among the remaining successful captures. In some cases, a stream capture client may have been part of a failover during its capture of the broadcast content segments, e.g., because one of the redundant origins failed. As a result, the stream capture may otherwise appear to have been successful, but the resulting asset would likely include undesirable artifacts as discussed above. Therefore, some implementations track when such failovers occur so that the assets resulting from such captures can be eliminated as candidates for the master JAB asset.

For most broadcast content, particularly for presentations depicting ongoing live events, most viewers are watching or are close to the "live playhead" of a stream, which means their media players are requesting the same few video fragments being requested by the media players of other viewers. This access pattern is amenable to caching of the fragments by CDNs. For JAB assets, the access pattern may be much less uniform, potentially rendering existing caching less effective. To compensate for this, the video fragments and manifests for JAB assets may be stored more physically proximate to viewers by copying the master JAB asset and its associated metadata and manifests to multiple geographic locations.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
generating media content representing a live event;
successively requesting portions of first manifest information representing the media content from a packager associated with the media content, the first manifest information being configured to support streaming of the media content while the live event is ongoing;
providing the first manifest information to a first client device;
streaming the media content to the first client device;
requesting video fragments of the media content at a plurality of bitrate variants using the first manifest information while the live event is ongoing;
storing copies of the video fragments for each of the video fragments without alteration;
determining that the live event has completed;
requesting a final portion of the first manifest information from the packager, the final portion of the first manifest information representing a full playback duration of the media content;
generating second manifest information from the final portion of the first manifest information, the second manifest information being static and specifying a start time and an end time of the media content, the second manifest information being configured to support on-demand access to the copies of the video fragments at storage locations different than those accessible using the first manifest information, the second manifest information comprises references that correspond to a plurality of bitrate variants for each of the video fragments of the media content, wherein the first manifest information and the second manifest information both include the same relative address information for the video fragments of the media content, and wherein the first manifest information and the second manifest information specify different root address information;
providing the second manifest information to a second client device; and
providing the copies of the video fragments to the second client device.

2. The method of claim 1, wherein the video fragments correspond to a plurality of streaming protocols including HTTP Live Streaming (HLS), Dynamic Adaptive Streaming over HTTP (DASH), and Smooth Streaming, and a plurality of bitrate variants for each of the streaming protocols.

3. The method of claim 1, wherein the media content is streamed to the first client device in accordance with a digital rights management license, and wherein the copies of the video fragments are provided to the second client device in accordance with the digital rights management license.

4. The method of claim 1, wherein the copies of the video fragments are provided to the second client device within ten minutes of completion of the live event.

5. A computer-implemented method, comprising:
obtaining first manifest information associated with media content, the first manifest information being configured to support streaming of the media content during a broadcast period;
requesting video fragments of the media content at a plurality of bitrate variants using the first manifest information;
storing copies of the video fragments without alteration;
determining that the stored copies of the video fragments represent a full playback duration of the media content;
generating second manifest information, the second manifest information specifying the full playback duration of the media content and being configured to support on-demand access to the copies of the video fragments at storage locations different than those accessible using the first manifest information, wherein the second manifest information comprises references that correspond to the plurality of bitrate variants for each of the video fragments of the media content, wherein the first manifest information and the second manifest information both include the same relative address information for the video fragments of the media content, and wherein the first manifest information and the second manifest information specify different root address information; and
providing the second manifest information to a client device.

6. The method of claim 5, wherein the video fragments correspond to a plurality of streaming protocols, and a plurality of bitrate variants for each of the streaming protocols.

7. The method of claim 5, wherein obtaining the first manifest information includes successively obtaining portions of the first manifest information as the broadcast period progresses, each portion of the first manifest information representing a corresponding portion of the full playback duration of the media content.

8. The method of claim 5, wherein generating the second manifest information includes requesting a final portion of the first manifest information, the final portion of the first manifest information representing the full playback duration of the media content.

9. The method of claim 5, wherein generating the second manifest information includes processing the first manifest information to generate the second manifest information.

10. The method of claim 5, further comprising:
using the second manifest information to determine that a first video fragment of the video fragments of the media content is unavailable; and
requesting the first video fragment using the first manifest information.

11. The method of claim 5, wherein the second manifest information is configured to provide access to at least some of the video fragments of the media content stored in a cache of a content distribution network during the broadcast period.

12. A system, comprising memory and one or more processors configured to:
obtain first manifest information associated with media content, the first manifest information being configured to support streaming of the media content during a broadcast period;
request video fragments of the media content at a plurality of bitrate variants using the first manifest information;
store copies of the video fragments without alteration;
determine that the stored copies of the video fragments represent a full playback duration of the media content;
generate second manifest information, the second manifest information specifying the full playback duration of the media content and being configured to support on-demand access to the copies of the video fragments at storage locations different than those accessible using the first manifest information, wherein the second manifest information comprises references that correspond to a plurality of bitrate variants for each of the video fragments of the media content, wherein the first manifest information and the second manifest information both include the same relative address information for the video fragments of the media content, and wherein the first manifest information and the second manifest information specify different root address information; and
provide the second manifest information to a client device.

13. The system of claim 12, wherein the video fragments correspond to a plurality of streaming protocols, and a plurality of bitrate variants for each of the streaming protocols.

14. The system of claim 12, wherein the memory and the one or more processors are configured to obtain the first manifest information by successively obtaining portions of the first manifest information as the broadcast period progresses, each portion of the first manifest information representing a corresponding portion of the full playback duration of the media content.

15. The system of claim 12, wherein the memory and the one or more processors are configured generate the second manifest information by requesting a final portion of the first manifest information, the final portion of the first manifest information representing the full playback duration of the media content.

16. The system of claim 12, wherein the memory and the one or more processors are configured generate the second manifest information by processing the first manifest information to generate the second manifest information.

17. The system of claim 12, wherein the memory and the one or more processors are further configured to:
use the second manifest information to determine that a first video fragment of the video fragments of the media content is unavailable; and
request the first video fragment using the first manifest information.

18. The system of claim 12, wherein the second manifest information is configured to provide access to at least some of the video fragments of the media content stored in a cache of a content distribution network during the broadcast period.

* * * * *